(12) United States Patent
Migl et al.

(10) Patent No.: US 11,852,041 B2
(45) Date of Patent: Dec. 26, 2023

(54) SYSTEM HAVING THERMAL ACCUMULATOR, METHOD FOR OPERATING SAME, AND METHOD FOR MODIFYING SAME

(71) Applicant: Siemens Energy Global GmbH & Co. KG, Bayern (DE)

(72) Inventors: Matthias Migl, Munich (DE); Ronald Schwarz, Bamberg (DE); Denis Tschetschik, Bubenreuth (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 0 days.

(21) Appl. No.: 17/793,393

(22) PCT Filed: Dec. 28, 2020

(86) PCT No.: PCT/EP2020/087910
§ 371 (c)(1),
(2) Date: Jul. 16, 2022

(87) PCT Pub. No.: WO2021/151604
PCT Pub. Date: Aug. 5, 2021

(65) Prior Publication Data
US 2023/0052951 A1     Feb. 16, 2023

(30) Foreign Application Priority Data

Jan. 29, 2020 (DE) ...................... 10 2020 201 068.4

(51) Int. Cl.
*F01K 23/10* (2006.01)
*F01K 3/00* (2006.01)
*F01K 23/18* (2006.01)

(52) U.S. Cl.
CPC ............... *F01K 23/10* (2013.01); *F01K 3/00* (2013.01); *F01K 23/18* (2013.01)

(58) Field of Classification Search
CPC .... F01K 23/10; F02C 7/32; F02C 7/36; F02C 9/28
See application file for complete search history.

(56) References Cited

U.S. PATENT DOCUMENTS 5,469,700 A * 11/1995 Corbett ..................... F02C 9/28
                                                                                       60/776
8,978,386 B2 * 3/2015 Sekiai ................... F01K 21/047
                                                                                       60/726

(Continued)

FOREIGN PATENT DOCUMENTS

CN        101970832 A      2/2011
CN        104136742 A     11/2014

(Continued)

OTHER PUBLICATIONS

Stahl, K et al:, "Flexibilisierung von Gas- und Dampfturbinenkraftwerken durch den Einsatz von Hochtemperatur-Wärmespeichern (FleGs)", F&E Vorhaben, Abschlussbericht an BMWi/PTJ; 2013; Flexibility of gas and steam turbine power plants through the use of high-temperature heat storage (FleGs), R&D project, final report to BMWi/PTJ; 2013; English machine translation attached.

(Continued)

*Primary Examiner* — Thuyhang N Nguyen
(74) *Attorney, Agent, or Firm* — Wolter Van Dyke Davis, PLLC

(57) ABSTRACT

A power generation installation in which exhaust gas from a gas turbine is fed to a thermal energy accumulator, wherein energy in the thermal energy accumulator can be employed for various purposes, a method for operating such an installation, and a method for the modification of existing installations. The thermal energy accumulator has sufficient capacity to permit the operation of a steam turbine in (Continued)

isolation for the storage of thermal energy from exhaust gas in the thermal energy accumulator.

26 Claims, 10 Drawing Sheets

(56) References Cited

U.S. PATENT DOCUMENTS

| | | | | |
|---|---|---|---|---|
| 9,670,843 | B2* | 6/2017 | Pang | F01N 3/20 |
| 9,677,809 | B1* | 6/2017 | Eustis | F25B 7/00 |
| 2010/0310356 | A1* | 12/2010 | Swintek | F02C 9/18 |
| | | | | 415/61 |
| 2011/0083443 | A1 | 4/2011 | Jockenhoevel | |
| 2013/0081395 | A1* | 4/2013 | Frey | F02C 6/14 |
| | | | | 60/671 |
| 2013/0192193 | A1 | 8/2013 | Yoshida | |
| 2014/0202157 | A1* | 7/2014 | Shinnar | F01K 23/10 |
| | | | | 60/659 |
| 2014/0366547 | A1 | 12/2014 | Kraft | |
| 2015/0033760 | A1 | 2/2015 | Koyama | |
| 2015/0035277 | A1 | 2/2015 | Brunhuber | |
| 2015/0240719 | A1* | 8/2015 | Kraft | F02C 6/16 |
| | | | | 290/52 |
| 2015/0267566 | A1 | 9/2015 | Vamvas | |
| 2016/0047307 | A1* | 2/2016 | Williamson | F02C 7/06 |
| | | | | 60/726 |
| 2016/0177827 | A1 | 6/2016 | Brunhuber | |
| 2018/0038352 | A1 | 2/2018 | Conlon | |
| 2018/0179960 | A1 | 6/2018 | Apte | |
| 2018/0340451 | A1 | 11/2018 | Becker | |
| 2019/0226462 | A1 | 7/2019 | Conlon | |

FOREIGN PATENT DOCUMENTS

| | | |
|---|---|---|
| CN | 108138601 A | 6/2018 |
| CN | 10325715 A | 10/2019 |
| CN | 110725725 A | 1/2020 |
| DE | 10260992 A1 | 7/2004 |
| DE | 10260993 A1 | 7/2004 |
| EP | 2574755 A2 | 4/2013 |
| EP | 3002423 A1 | 4/2016 |

OTHER PUBLICATIONS

PCT International Search Report and Written Opinion of International Searching Authority dated Mar. 16, 2021 corresponding to PCT International Application No. PCT/EP2020/087910 filed Dec. 28, 2020.

He, Qing; Luo Ning. Thermal-economic analysis of combined heat and power generation unit of gas-steam combined cycle[J]. Thermal Power Generation, 2018, 47(4): 49-56.; 2018; ENGLISH abstract on p. 1.

* cited by examiner

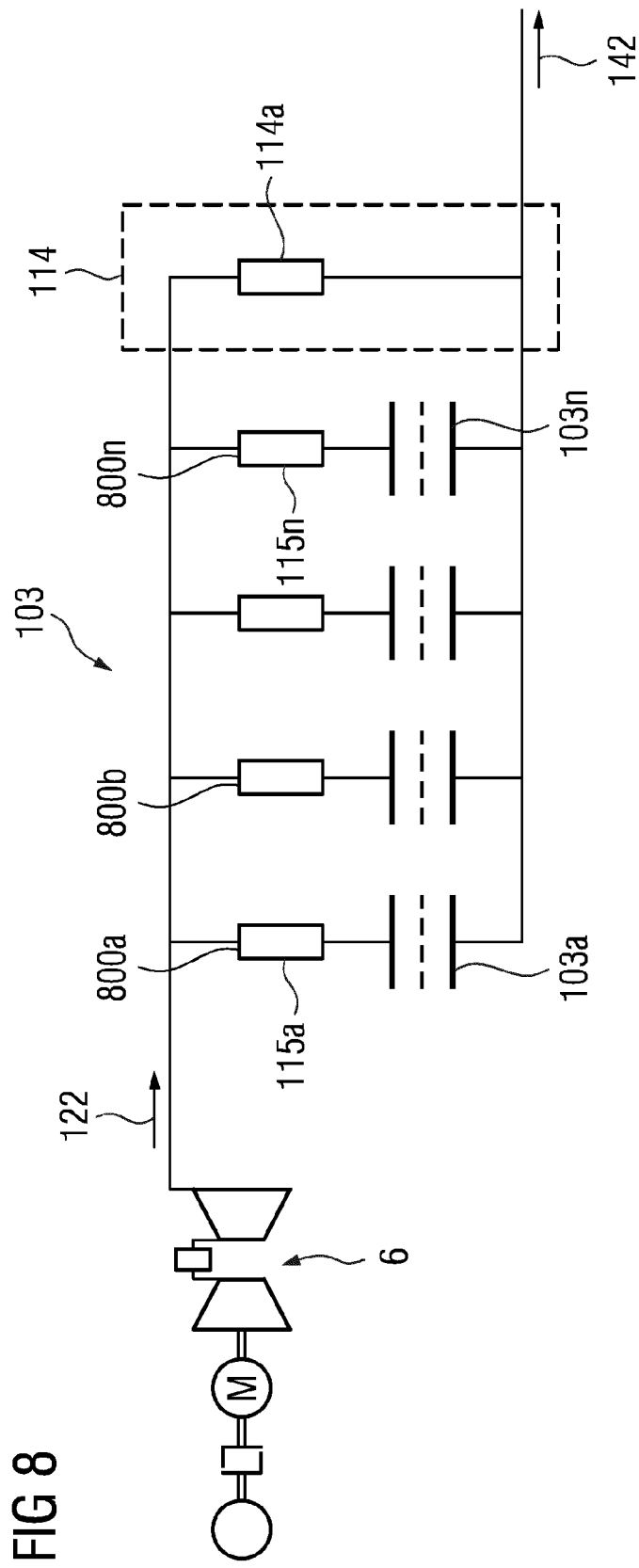

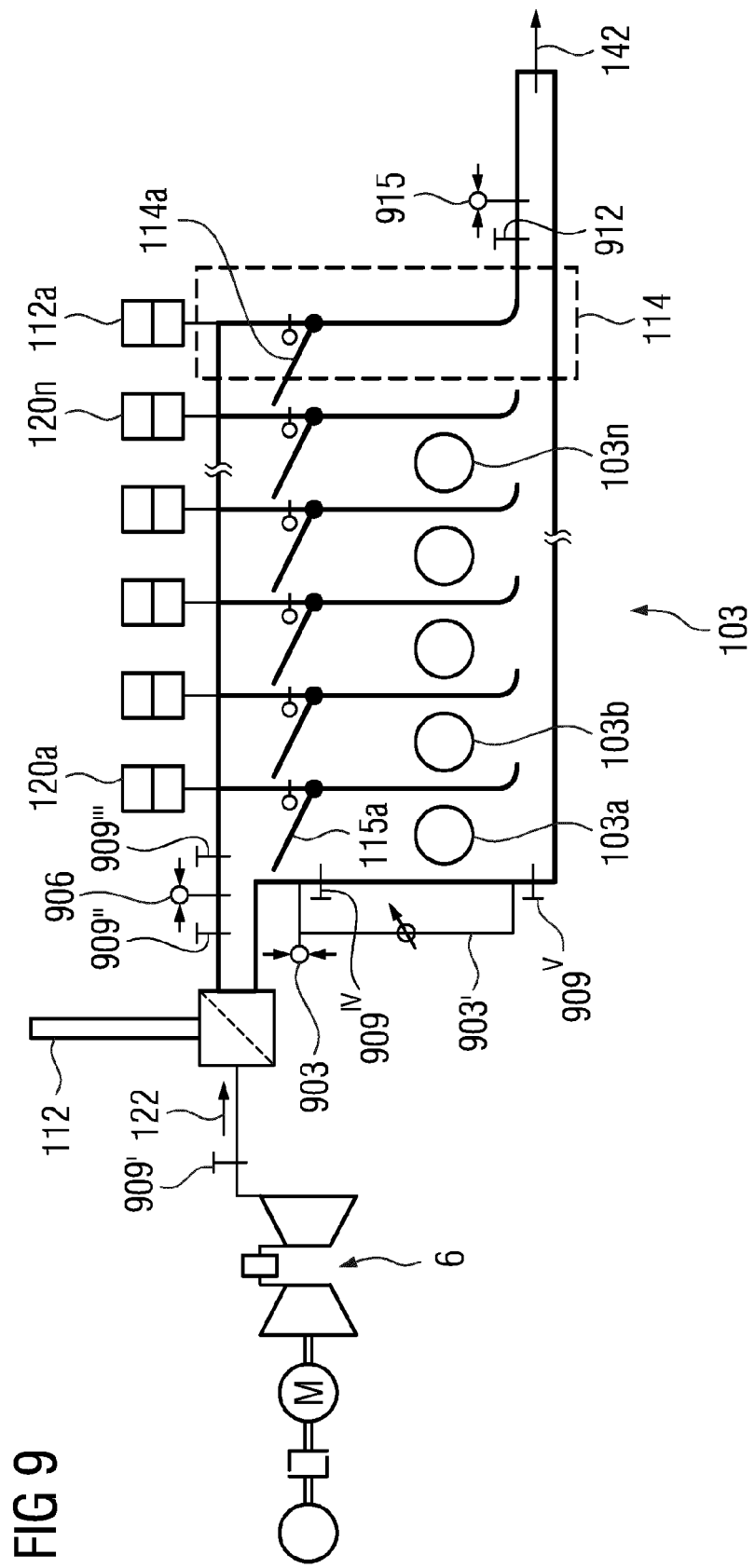

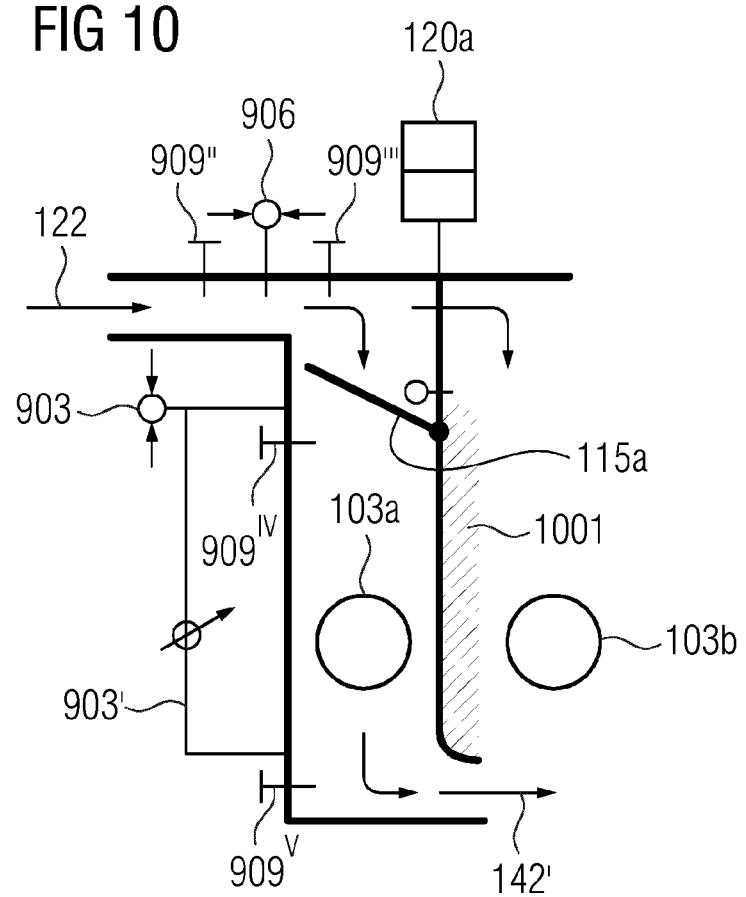

SYSTEM HAVING THERMAL ACCUMULATOR, METHOD FOR OPERATING SAME, AND METHOD FOR MODIFYING SAME

CROSS REFERENCE TO RELATED APPLICATIONS

This application is the US National Stage of International Application No. PCT/EP2020/087910 filed 28 Dec. 2020, and claims the benefit thereof. The International Application claims the benefit of German Application No. DE 10 2020 201 068.4 filed 29 Jan. 2020. All of the applications are incorporated by reference herein in their entirety.

FIELD OF INVENTION

The invention relates to an installation in which exhaust gas from a gas turbine is fed to a thermal energy accumulator, wherein energy in the thermal energy accumulator can be employed for various purposes, to a method for operating such an installation, and to a method for the modification of existing installations.

BACKGROUND OF INVENTION

In the current energy market, combined cycle power plants are frequently employed as "peakers" and, in consequence, are required to execute a rapid capacity run-up or run-down. Although this is possible from an idle state, rapid start-ups of this type, on the grounds of extreme thermal and physical loading, are detrimental to the service life of a gas turbine, a down-circuit boiler and a steam turbine. On economic grounds, any continuous running, or "parking" of the combined cycle power plant at minimal load is only a conditionally rational option.

In order to permit a response to highly volatile requirements of the current energy market, in many cases, only the gas turbine is started up in solo operation. In this operating mode, instead of being delivered to the steam generation process, the energy content of exhaust gas is directly discharged in full to the ambient air via a stack, without further use. The efficiency of the combined cycle power plant is reduced accordingly, thereby reducing the economic utilization of the combined cycle power plant.

EP 2 574 755 A2 discloses a system and a method for generating electric current, wherein hot gas for the gas turbine undergoes heat-up by means of solar energy. This has a disadvantage, in that the gas turbine cannot be actuated individually.

SUMMARY OF INVENTION

An object of the invention is therefore the resolution of the above-mentioned problem.

This object is fulfilled by an installation, by a method for operating an installation, and by a method for the modification of an installation.

BRIEF DESCRIPTION OF THE DRAWINGS

FIGS. 2-10 and the description represent only exemplary embodiments of the invention.

DETAILED DESCRIPTION OF INVENTION

Figure 1:
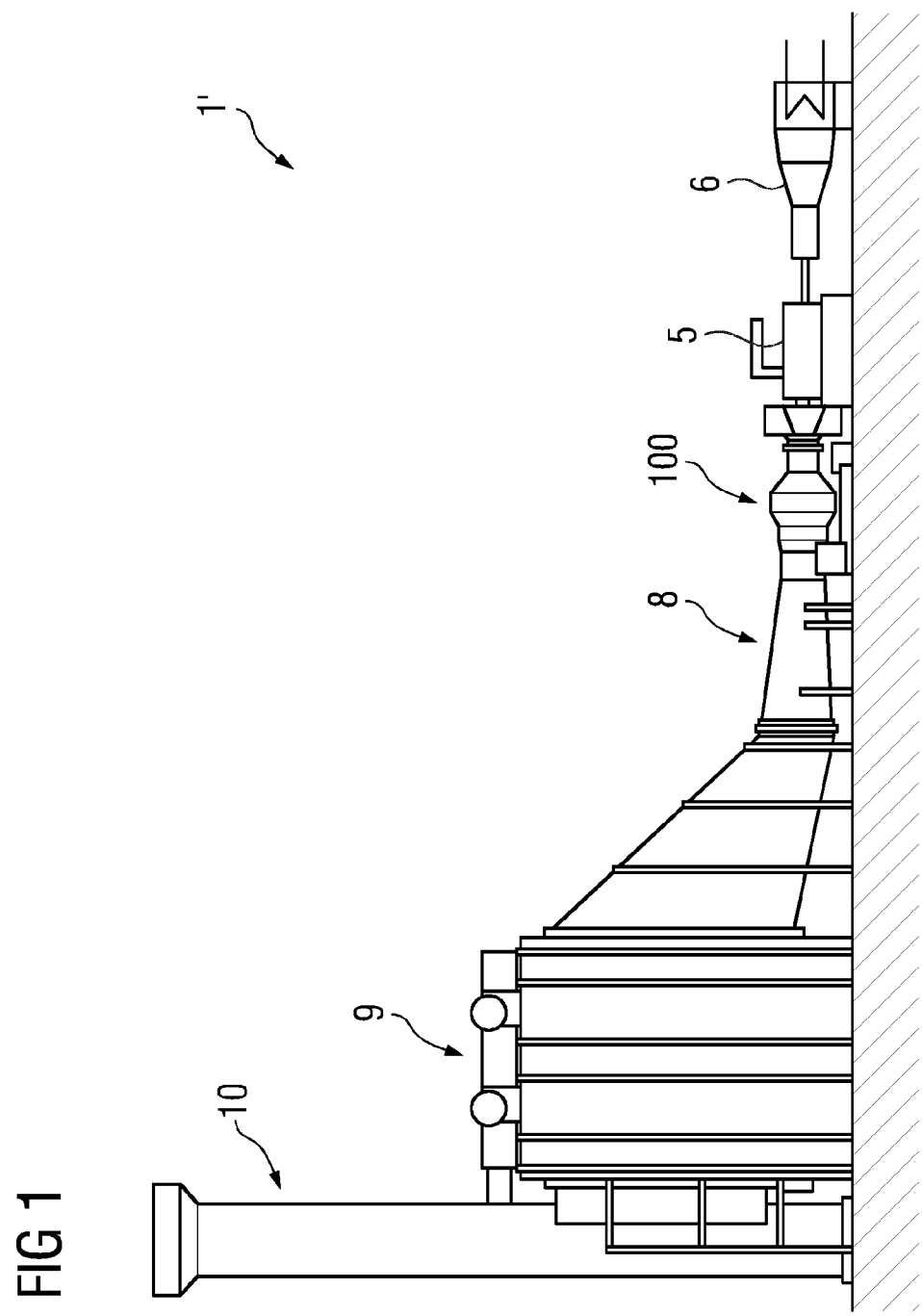
FIG. 1 shows a combined cycle power plant according to the prior art, and the invention is represented schematically in FIGS. 2 to 10.

FIG. 1 shows an exemplary energy conversion installation 1' according to the prior art.

A gas turbine 100 is connected to an electric generator 5 for generating electric power.

The electric generator 5 is also connected to a steam turbine 6 (single-line system).

A steam turbine will be present in the case of a combined cycle gas and steam turbine power plant (CCPP). An energy conversion installation 1' can also comprise only a gas turbine 100, with no steam turbine 6.

Hot exhaust gas from the gas turbine 100 flows via a diffuser 8 into a heat recovery installation 9 (heat recovery steam generator or "HRSG", with or without auxiliary firing), wherein the hot exhaust gas is further employed and, in particular, is employed for the generation of steam for the steam turbine 6. Preferably, an exhaust air stack 10 is also provided.

Figure 2:
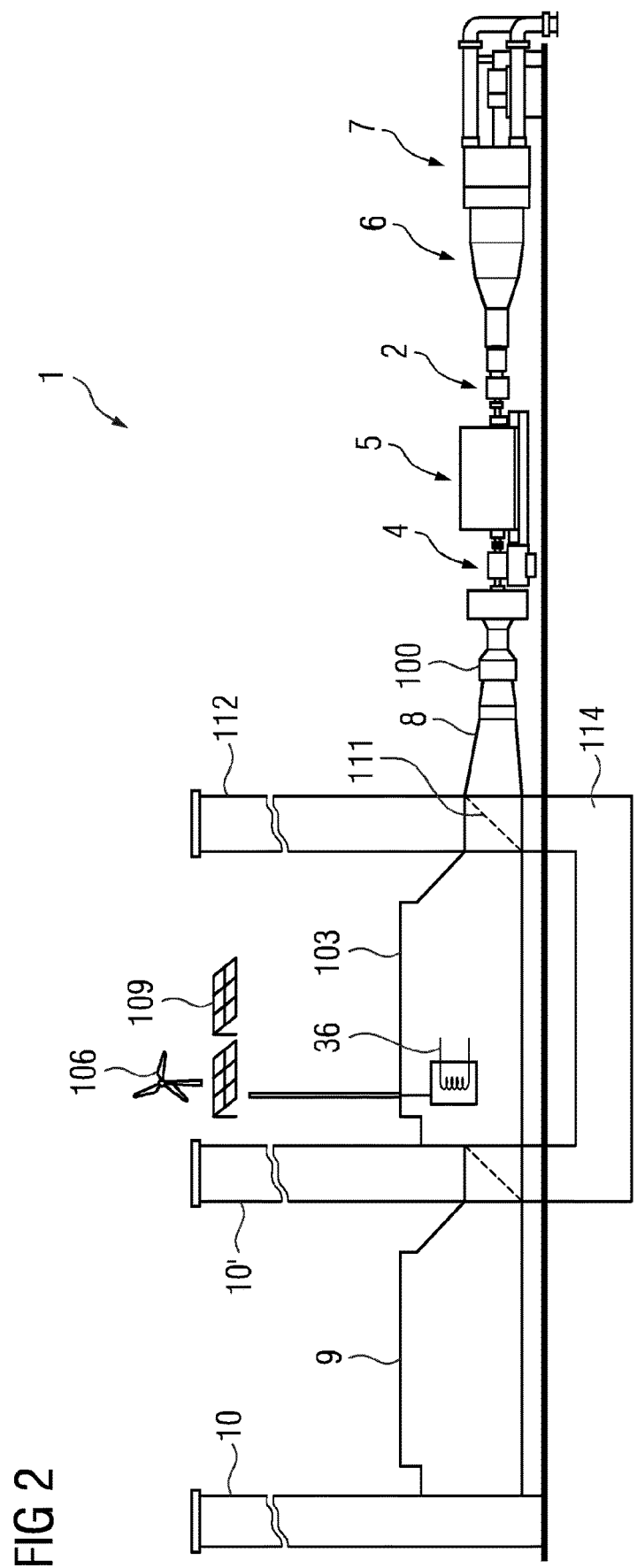

FIG. 2 shows a schematic representation of an installation 1 according to the invention.

The gas turbine 100 is advantageously coupled to the electric generator 5 for generating electric power via a gearbox 4 or a coupling 4.

A steam turbine 6 is present in the case of a combined cycle gas and steam turbine power plant (CCPP). In this context, and in the entire description of the invention, the term steam turbine signifies a single steam turbine or a steam turbine set comprised of at least two or more steam turbines, to be selected from high-pressure turbine(s), medium-pressure turbine(s) or low-pres sure turbine(s).

The generator 5 is also connected to the steam turbine 6, advantageously by means of a steam turbine coupling 2, particularly by means of a SSS coupling.

The installation 1, 1" (FIG. 6) is designed such that the steam turbine 6 can operate in isolation.

In particular, a condenser 7 is connected to the steam turbine 6.

According to the invention, hot exhaust gas from the gas turbine 100 can be fed via the diffuser 8 into a thermal energy accumulator 103.

The energy content of the energy accumulator 103 is sufficient to prolong the independent and constant operation of the steam turbine 6 for at least a few minutes.

The energy content of the energy accumulator 103 is advantageously of the order of at least 1 GWh, and particularly of the order of at least 2 GWh (gigawatt-hours).

Figure 6:
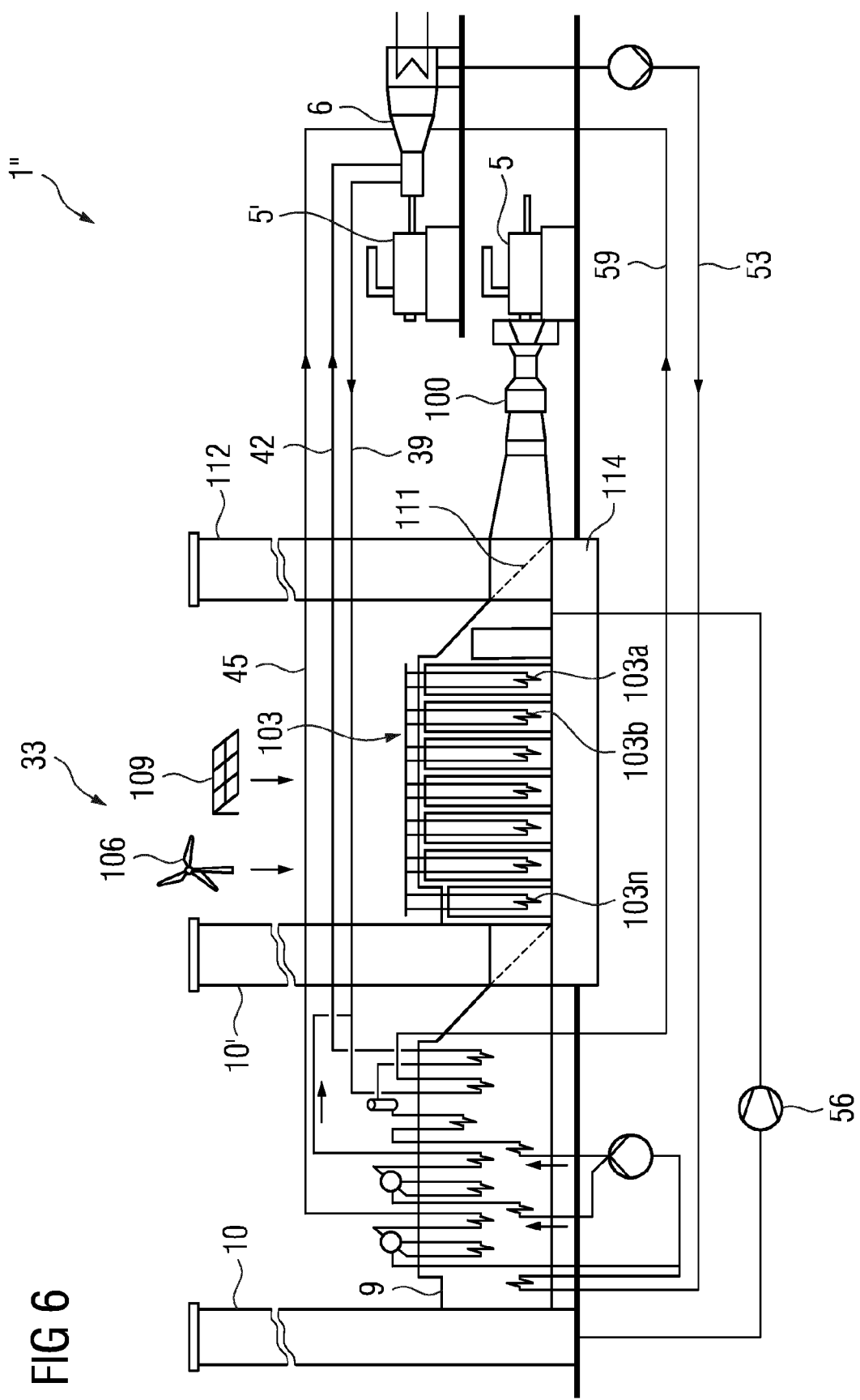

Stored energy can be released from the energy accumulator 103 as required, particularly for the heat-up of water for the purposes of district heating 25, which can then be injected into the district heating system, and/or is employed for the generation of steam for the CCPP installation 1, 1" (FIG. 6).

Moreover, stored energy from the energy accumulator 103 can be used for the preheating of the fuel or gas employed for the combustion process in the gas turbine 100, thereby enhancing the efficiency of the gas turbine 100.

Further applications include the release of process heat and process steam from the energy accumulator 103, for example for the drying of sewage sludge, or for use in air preheaters, refrigeration machines or expansion machines.

Optionally, renewable energy in the form of electric power from wind turbine installations 106 or solar energy installations 109 can be fed into the thermal energy accumulator 103, particularly by means of an electric heater 36.

Depending upon the application, particularly in the case of the CCPP 1, 1" (FIG. 6), a bypass stack 112 is present, which conveys hot exhaust gas from the gas turbine 100 either directly into the thermal energy accumulator 103 or into the heat recovery system (HRSG) 9.

If only the gas turbine 100 is operating at full load, and the energy thereof is required to drive the generator 5, or if the gas turbine 100 is operating as a "peaker", or in open cycle mode, wherein the latter may be an independent gas turbine 100 or a gas turbine 100 in a CCPP installation 1, hot exhaust gas from the gas turbine 100 is entirely or substantially fed directly into the thermal energy accumulator 103.

In combined cycle operation, the gas turbine 100, by means of its hot exhaust gas, can thus be additionally employed for the charging of the thermal energy accumulator 103.

In combined cycle operation, depending upon grid capacity utilization, hot exhaust gas from the gas turbine 100 can be fed to the HRSG 9 and/or injected into the thermal energy accumulator 103.

In the event of reduced power demand on the grid, the gas turbine 100 can be run down to a specific load, and is advantageously taken entirely off-line.

Accordingly, no further charging of the thermal energy accumulator 103 by the gas turbine 100 must then be executed. However, the energy accumulator 103 can continue to be charged by wind energy 106 and solar energy 109, by means of an electric heater 36.

If necessary, the thermal energy accumulator 103 is discharged by means of the HRSG 9, in order to operate the steam turbine 6 which then, in turn, drives the generator 5, 5' (FIG. 6).

A further exhaust air stack 10' is arranged down-circuit of the energy accumulator 103, in the event that, for example, hot air is discharged from the energy accumulator 103.

Preferably, a bypass line 114 is further provided, having a damper 111.

Figure 3:
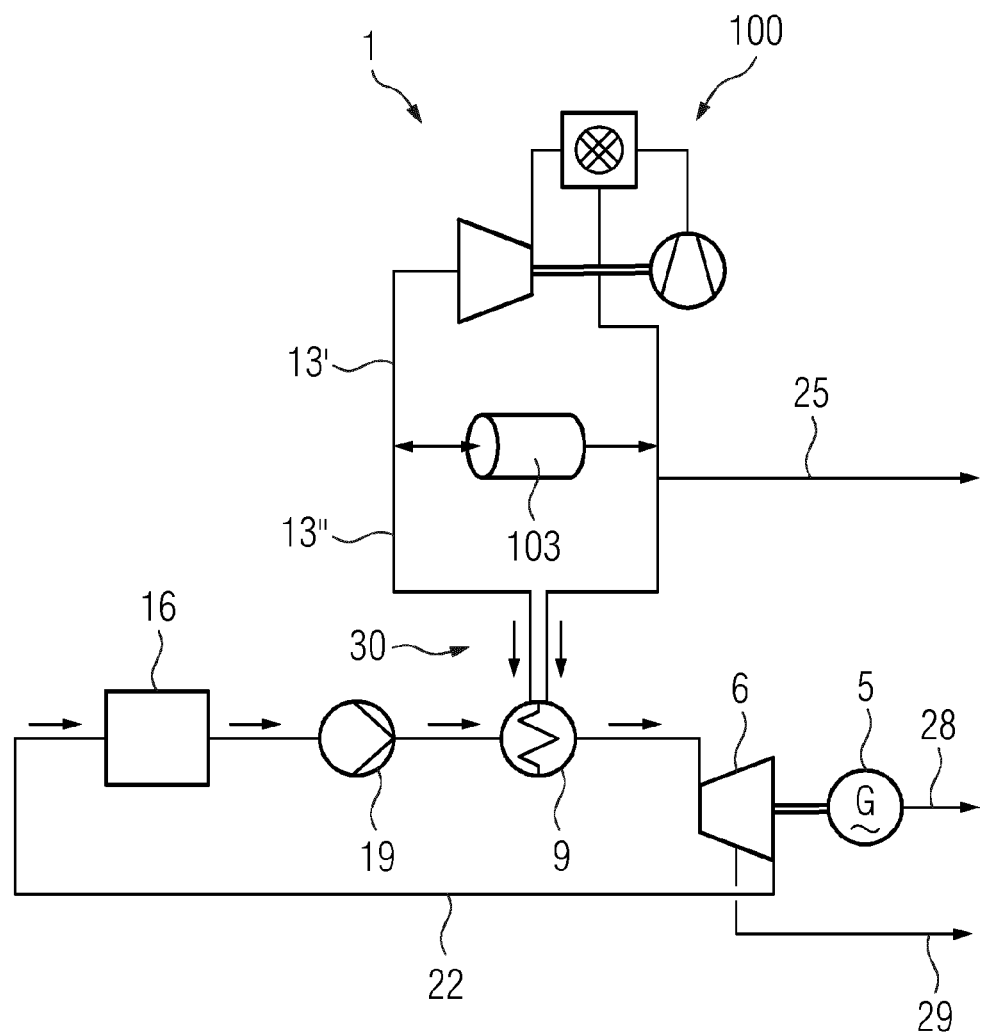

FIG. 3 illustrates a detailed layout of a CCPP installation 1 according to the invention.

A steam turbine 6 and up-circuit processes, as illustrated in FIG. 3 can be used to employ energy stored in the energy accumulator 103 for the generation of electricity.

In the upper part of FIG. 3, the gas turbine 100 is represented, which is operated in open cycle or simple cycle mode (solo mode), or in combined cycle mode.

In any event, hot exhaust gas from the gas turbine 100 can be fed via a first feed line 13' to the thermal energy accumulator 103.

Energy can also be extracted from the thermal energy accumulator 103 in the form of hot air, which is then fed to the HRSG 9 or to another consumer of thermal energy 30.

Thermal energy 30 from the energy accumulator 103 is employed for the generation of electric power. To this end, hot air from the thermal energy accumulator 103 is extracted via a discharge line 13" for the corresponding generation, particularly by means of a heat exchanger (HRSG) 9, a heat exchanger 19, an exhaust steam line 22 and a condenser 16, of hot steam for a steam turbine 6, which generates electrical energy 28 or process steam 29 by means of the generator 5.

It is also possible for thermal energy 30 from the energy accumulator 103 to be employed for the heat-up of water, in refrigeration machine applications, in expansion machines, as process heat for drying installations, or for district heating 25.

Figure 4:
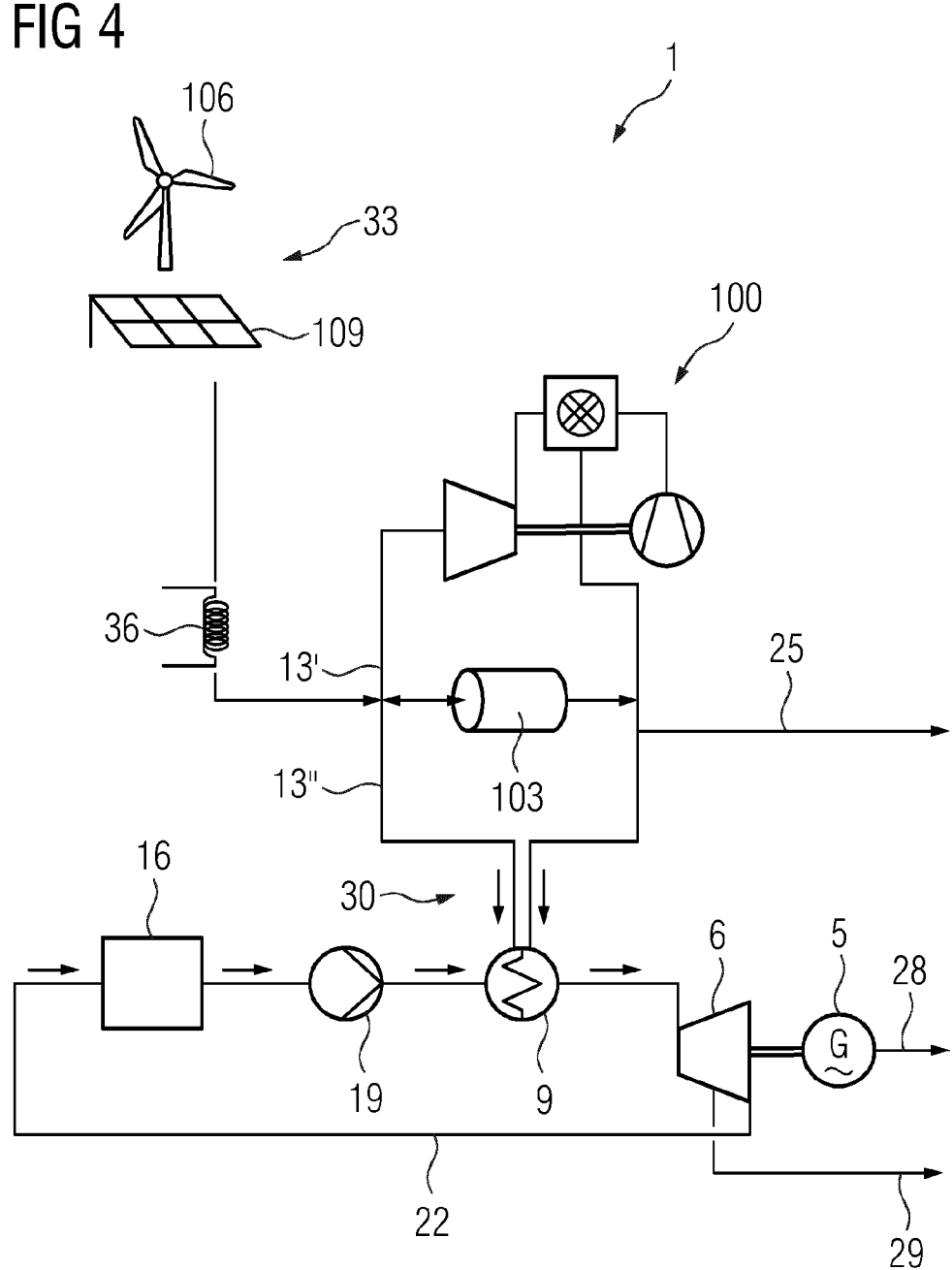

FIG. 4 illustrates a further variant of a CCPP installation 1 according to the invention in which, additionally to FIG. 3, renewable energy sources 33, such as wind power 106, solar energy 109 or electricity from pumped storage hydro plants is employed for the heat-up of the thermal energy accumulator 103 by means of the electric heater 36 and, optionally, for the heat-up of exhaust gas from the gas turbine 100.

In FIG. 3, FIG. 4 and the following figures, the part comprised of the gas turbine 100 or the CCPP installation 1, 1" (FIG. 6) is shown in a schematic representation only, and particularly corresponds to the representation according to FIG. 2.

Figure 5:
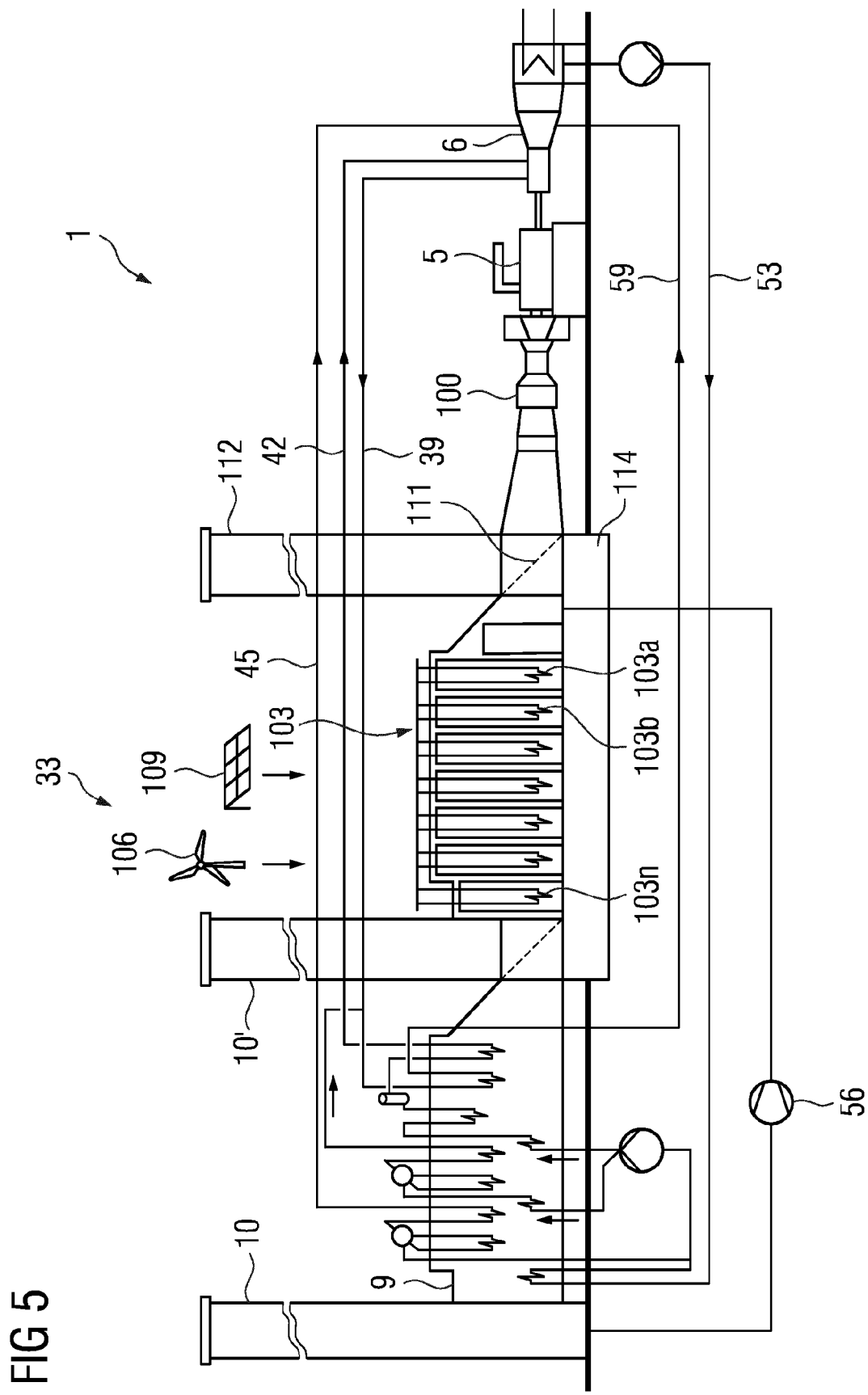

In FIG. 5, it is shown that the thermal energy accumulator 103 can advantageously be divided into modules 103a, 103b, ... 103n, which can be employed, also in FIGS. 2, 3, 4, 6 and 7, for the selective charging or discharging thereof. Accordingly, the thermal energy accumulator 103 advantageously assumes a modular structure.

Individual modules 103a, 103b, ..., 103n can undergo heat-up in a mutually separate manner, and can thus be brought to different temperatures and different levels of thermal loading.

High temperatures in the energy accumulator 103 or in the modules 103a, ..., 103n are thermodynamically ideal. Once a module 103a, 103b, ... has achieved the maximum or desired temperature, a further module 103, ... can undergo heat-up.

Correspondingly, the module 103a, 103b, ..., having the highest temperature is "discharged" first, particularly for the employment thereof for the steam turbine 6 or the HRSG 9.

The modular energy accumulator 103 comprises, at least in part, and particularly for all the modules 103a, 103b, ..., 103n, a separate inlet and/or outlet in each case for the admission or discharge of hot gas from the gas turbine 100 or to the HRSG 9.

The installation and method provide the following advantages:

direct injection of exhaust gas energy into a thermal accumulator,
the employment of volcanic rock, stones, lime, refractory bricks or ceramics as a storage material for the thermal energy accumulator,
an indirect combination of the storage of electrically generated energy with thermal exhaust gas energy,
the extraction of heat from the energy accumulator by means of a steam turbine process
for employment in desalination plants,
for the preheating of natural gas,
for the preheating of gas turbine inlet air,
for the production of district heat,
for application in refrigeration installations, or
for the application of process steam, inter alia, in chemical plants.

Via a first line 39 according to FIG. 5, a fluid in the form of cooled steam, particularly from the high-pressure section of the steam turbine 6 is fed back to the HRSG 9 for intermediate superheating, and undergoes further heat-up therein.

Via a second line 42 according to FIG. 5, a fluid in the form of high-pressure steam is fed from the high-pressure section of the HRSG 9 to the steam turbine 6.

Via a third line 45 according to FIG. 5, a fluid in the form of low-pressure steam is fed from the low-pressure section of the HRSG 9 to the low-pressure section of the steam turbine 6.

Via a fourth line 53 according to FIG. 5, a fluid in the form of water (condensate) is fed back to the HRSG 9, and undergoes further heat-up therein.

Via a fifth line 59 according to FIG. 5, a fluid in the form of medium-pressure steam, further to intermediate superheating in the HRSG 9, is fed to the steam turbine 6. A recirculation fan 56 can advantageously be employed for the purposes of support.

The representation according to FIG. 5 comprises a single-shaft installation having a gas turbine 100, a generator 5 and a steam turbine 6, coupled in a single line.

In FIG. 6, by way of distinction from FIG. 5, a further exemplary embodiment is represented, wherein a further generator 5' is provided, thus constituting a CCPP installation 1" in a multi-shaft configuration.

In the representation according to FIG. 6, an overall assembly of a CCPP installation 1" in a multi-shaft configuration is represented. The gas turbine 100 and the associated generator 5 are coupled in one line, whereas the steam turbine 6 and the further associated generator 5' are coupled in a separate line.

Employment of the thermal accumulator 103 is possible in both scenarios (FIGS. 5, 6).

In the single-shaft assembly 1, a steam turbine coupling 2 (FIG. 2) is provided between the generator 5 and the steam turbine 6, which permits the separate operation of the generator 5, wherein the latter is driven exclusively by the gas turbine 100.

The CCPP installation 1", in a multi-shaft assembly, permits a broad scope of flexibility. The thermal energy accumulator 103 is supplied by the gas turbine 100, and re-energization is executed via the HRSG 9, by means of the steam turbine 6 and the generator 5', wherein the gas turbine 100 and the generator 5 can be operated independently therefrom. The driven load profile of the gas turbine 100 can also vary from the load profile of the discharge process of the thermal energy accumulator 103.

Figure 7:
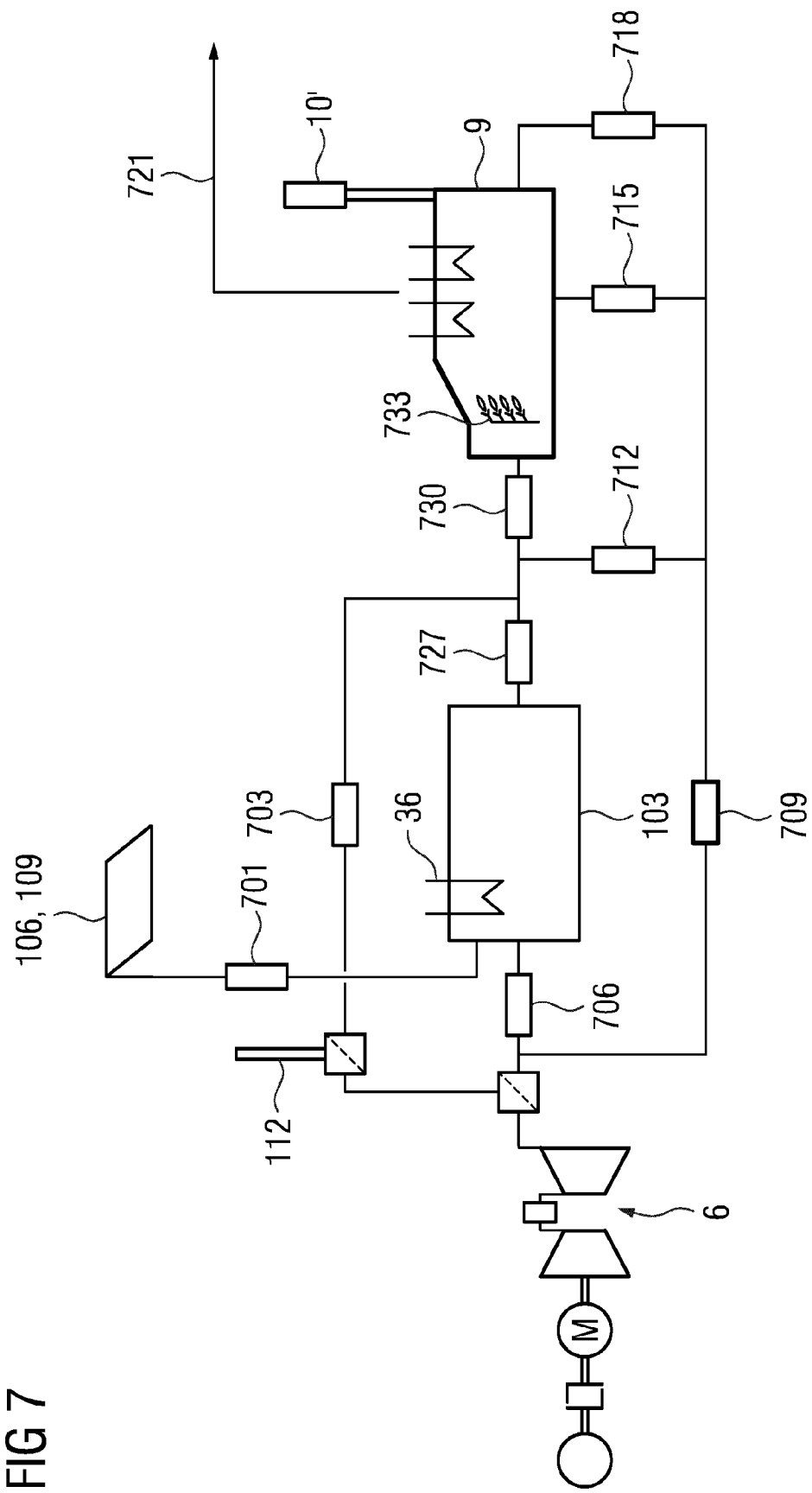

FIG. 7 shows a schematic representation of the installation according to the preceding FIGS. 2 to 6.

The thermal energy accumulator 103 can also undergo heat-up by means of solar energy 109 and/or wind energy 106, wherein power generated from a renewable energy source is employed for the purposes of heat-up.

This infeed is controlled via a capacity regulator 701 for electric power from renewable energy sources.

The flux of thermal energy is controlled by various sliding gate regulators (particularly by means of guillotines) 703, 706, 727, 730, dampers 709, 712 and shut-off valves 715, 718.

An outfeed 721 of district heat 25 or process steam can also be provided.

Auxiliary firing 733 can also be provided and executed in the boiler, particularly using low-calorific gases from biogas plants (in all exemplary embodiments, according to FIG. 2 and following).

In FIG. 8, the thermal energy accumulator 103 according to the preceding figures is represented in detail, wherein the individual modules 103a, 103b to 103n are represented, each of which has a controller 800a, 800b, . . . , 800n, in order to permit the actuation of the individual modules 103a, b, . . . , n, particularly the exhaust gas valves 115a, . . . n thereof. The modules 103a, b, . . . , n are thus spatially separated from one another by means of partitions.

An inlet 122 is provided for hot exhaust gases from the gas turbine 100, and an outlet 142 from the thermal accumulator to the HRSG 9 in the steam generation process.

Also represented is the bypass line 114, down-circuit of the thermal energy accumulator 103, having an exhaust gas valve 114a.

FIG. 9 shows a similar detailed representation to FIG. 8, wherein drives are provided, particularly hydraulic drives 120a, 120b, . . . , 120n; 112a, in order to actuate the charging or discharging of the individual modules 103a to 103n of the thermal accumulator 103, and of the bypass line 114.

Pressure gages 903, 903', 906, 915, and temperature gages 909', 909", 909''', 909$^{IV}$, 909$^{V}$ and 912 are employed, in order to control or regulate charging/discharging.

Temperature can be measured at the inlet 122 by means of sensors 909' arranged up-circuit 909" and down-circuit 909''' of a pressure gage 906, down-circuit 909$^{IV}$ of the exhaust gas installation 115a and at the end 909V of the module 103a.

The arrangement of a temperature gage 912 and a pressure gage 915 at the outlet 142 is also a rational option.

FIG. 10 shows a detailed representation of an individual module 103a according to FIG. 9, as an example of the other modules in the thermal accumulator 103.

Each module 103a is opened or closed by means of a hydraulically-operated valve 120a. The inlet 122 admits hot exhaust gas from the gas turbine 100 to the accumulator module 103a, the temperature of which is measured by means of temperature sensors 909", 909''', 909$^{IV}$, 909$^{V}$. Moreover, a pressure gage 906 is provided in the inlet region.

The pressure gradient and the temperature gradient within the thermal accumulator can be determined by means of a differential pressure measuring device 903 and temperature sensors 909", 909''', which are arranged in the inlet region or in the outlet region 909$^{V}$ of the module 103a.

Preferably, between the individual elements and/or the outer region of the modules, insulation 1001 can be provided between the individual modules 120a, . . . .

For the discharging of the accumulator, heat is evacuated via the outlet 142 in the direction of the waste heat recovery boiler HRSG 9.

Sensors 903 are also provided for the measurement of a differential pressure within a module 103a.

The thermal energy accumulator 103 or the CCPP installation 1 and 1" as a whole can thus be employed:

for the re-electrification of stored thermal energy 30, or for the generation of process steam, by means of the HRSG 9 and at least one steam turbine 6, for district heating or, specifically, for the provision of process heat for process steam consumers, or for freely available employment in the combined cycle process, for the preheating of intake air for the compressor, in order to permit the maintenance of compliance with emission limits for the gas turbine in lower part-load operating modes, for the preheating of fuel for the gas turbine, in order to improve efficiency, for the generation of sealing steam for the steam turbine 6, for the continuous heating of the HRSG 9 or the steam turbine 6, wherein, particularly, the last of these measures is employed to permit the more rapid run-up of the CCPP installation 1, 1" and/or the gas turbine 100. This is particularly appropriate and necessary in a flexible power market or grid system, in which substantial quantities of renewable energy 33 are injected into the grid system in a variable manner.

The thermal accumulator 103 is advantageously not only employed for frequency stabilization.

A significant advantage of the thermal accumulator 103 is provided in that the latter, according to FIGS. 2 to 10, can also be incorporated by retrofitting to an existing installation.

A further key feature of the thermal accumulator 103 is its controlled and selective charging and discharging, and the structural scalability thereof, in accordance with the technical requirements of the power generation installation 1, 1".

The invention claimed is:

1. A power generation installation, at least comprising:
    at least one gas turbine respectively having an exhaust gas facility, in particular only one gas turbine,
    at least one generator,
    at least one steam turbine, wherein the steam turbine comprises either a single steam turbine or a steam turbine set comprised of a plurality of steam turbines, to be selected from: high-pressure turbine(s) and/or medium-pressure turbine(s) and/or low-pressure turbine(s),
    at least one thermal energy accumulator, in particular only one thermal energy accumulator,
    wherein, via a bypass stack of the exhaust gas facility of the respective gas turbine, hot exhaust gas from the gas turbine, preferably directly, can be fed into the at least one thermal energy accumulator,
    wherein the thermal energy accumulator has sufficient capacity to permit the operation of the steam turbine in isolation, wherein, in particular, said capacity is at least 1 GWh and, more particularly, is at least 2 GWh, for the storage of thermal energy from exhaust gas in the thermal energy accumulator;
    wherein a heat recovery system is provided, into which hot exhaust gas from the gas turbine and/or steam from the steam turbine and/or energy from the thermal energy accumulator to be admitted;
    wherein the hot exhaust gas from the gas turbine is admitted to the heat recovery system via at least one bypass included in the exhaust gas facility.

2. The installation as claimed in claim 1, configured in the form of a CCPP installation in a single-shaft configuration.

3. The installation as claimed in claim 1, configured in the form of a CCPP installation in a multi-shaft configuration.

4. The installation as claimed in claim 1, wherein the steam turbine can be operated in isolation, without the gas turbine, in order to drive the generator.

5. The installation as claimed in claim 1, wherein a coupling is provided between the steam turbine and the generator.

6. The installation as claimed in claim 1, wherein a coupling is provided between the gas turbine and the generator.

7. The installation as claimed in claim 1, wherein the generator can be driven by the gas turbine and/or by a steam turbine.

8. The installation as claimed in claim 1, wherein a second generator is provided, which is only connected to the steam turbine.

9. The installation as claimed in claim 1, wherein the at least one bypass is provided between a diffuser of the gas turbine and the thermal energy accumulator, which permits hot exhaust gas from the gas turbine to be selectively fed to the thermal energy accumulator and/or to a heat recovery system.

10. The installation as claimed in claim 1, wherein the at least one generator comprises a single generator for the gas turbine and a single generator for the steam turbine.

11. The installation as claimed in claim 1, wherein the at least one generator comprises a single generator for the gas turbine and the steam turbine, particularly in the form of a single-shaft installation.

12. The installation as claimed in claim 1, wherein the thermal energy accumulator assumes a modular structure, such that the energy accumulator can undergo variable heat-up in its individual modules, particularly wherein the individual modules are separated by partitions, particularly by means of a respective insulation.

13. The installation as claimed in claim 12, wherein the modular energy accumulator, at least for two modules, and particularly for all modules, respectively comprises an input and/or an output for the admission and/or discharge of hot gas from the gas turbine or for delivery to the heat recovery system.

14. The installation as claimed in claim 1, comprising temperature sensors and pressure sensors on the thermal energy accumulator.

15. The installation as claimed in claim 1, comprising at least two, and particularly three stacks at various outlets.

16. A method for operating a power generation installation, at least comprising
    at least one gas turbine respectively having an exhaust gas facility, in particular only one gas turbine,
    at least one generator,
    at least one steam turbine, wherein the steam turbine comprises either a single steam turbine or a steam turbine set comprised of a plurality of steam turbines, to be selected from: high-pressure turbine and/or medium-pressure turbine and/or low-pressure turbine,
    at least one thermal energy accumulator, in particular only one thermal energy accumulator, having a capacity which is sufficient to prolong the independent operation of the steam turbine, particularly having a capacity of at least 1 GWh, and more particularly a capacity of at least 2 GWh,
    wherein the generator is driven by the gas turbine and/or the steam turbine,
    wherein, via a bypass stack of the exhaust gas facility, hot exhaust gas from the gas turbine, at least partially or in full, particularly directly, is fed into the thermal energy accumulator,
    wherein, in particular, only exhaust gas from a gas turbine is employed for the heat-up of a thermal energy accumulator,
    and particularly comprising means for the storage of thermal energy in the thermal energy accumulator;
    wherein a heat recovery system is provided, into which hot exhaust gas from the gas turbine and/or steam from the steam turbine and/or energy from the thermal energy accumulator to be admitted;
    wherein the hot exhaust gas from the gas turbine is admitted to the heat recovery system via a bypass included in the exhaust gas facility.

17. The method as claimed in claim 16, wherein stored energy from the thermal energy accumulator is employed for the operation of the steam turbine, for the generation of process steam, for the delivery of process heat for other processes, for the preheating of fuel and/or combustion air, for the generation of sealing steam for the steam turbine and/or for the continuous heating of the steam turbine and a heat recovery system.

18. The method as claimed in claim 16, wherein hot exhaust gas from the gas turbine is selectively diverted to the thermal energy accumulator and/or to a heat recovery system, particularly by means of the bypass.

19. The method as claimed in claim 16,
wherein the thermal energy accumulator is selectively charged and/or discharged.

20. The method as claimed in claim 16,
wherein the gas turbine is operated in open cycle mode.

21. The method as claimed in claim 16,
wherein the gas turbine is operated in combined cycle mode.

22. The method as claimed in claim 16,
wherein only the steam turbine in a CCPP installation is operated, in particular only by means of the energy from the thermal energy accumulator.

23. The method as claimed in claim 16,
wherein stored energy in the thermal energy accumulator is employed for the preheating of gas for combustion in the gas turbine and/or for the preheating of air for the gas turbine and/or for the generation of district heat and/or for the generation of process steam, for the generation of sealing steam in the steam turbine, and/or
wherein the heat-up and/or the maintenance of temperature in the heat recovery system and/or in the steam turbine is executed by means of energy from the thermal energy accumulator.

24. The method as claimed in claim 16,
wherein the gas turbine is operated with hot gas at temperatures equal to or greater than 1200 K, particularly equal to or greater than 1600 K, particularly wherein the gas turbine is only operated using fossil fuels, particularly gas, diesel or other fuels, which are burned in a combustion chamber of the gas turbine.

25. The method as claimed in claim 16,
wherein only the gas turbine is operated, for the sole purpose of generating hot exhaust gas for the thermal energy accumulator, thus permitting a rapid capacity run-up of the gas turbine.

26. A method for the modification of an existing power generation installation, particularly a CCPP installation,
wherein at least one thermal energy accumulator is retrofitted, which can undergo heat-up by means of hot exhaust gas from a gas turbine,
and optionally, conversion to an installation,
which can be operated as claimed in claim 16.

* * * * *